(12) United States Patent
Tsuji

(10) Patent No.: US 6,480,258 B2
(45) Date of Patent: Nov. 12, 2002

(54) PHOTO PRINTING APPARATUS

(75) Inventor: Yuki Tsuji, Wakayama (JP)

(73) Assignee: Noritsu Koki Co., Ltd., Wakayama-Ken (JP)

( * ) Notice: Subject to any disclaimer, the term of this patent is extended or adjusted under 35 U.S.C. 154(b) by 0 days.

(21) Appl. No.: 09/859,221

(22) Filed: May 16, 2001

(65) Prior Publication Data
US 2001/0053290 A1 Dec. 20, 2001

(30) Foreign Application Priority Data
May 22, 2000 (JP) .................................. 2000-149520

(51) Int. Cl.⁷ .............................................. G03B 27/52
(52) U.S. Cl. ........................................... 355/38; 355/77
(58) Field of Search ........................ 355/32–38, 67–69, 355/77; 382/102

(56) References Cited

U.S. PATENT DOCUMENTS

2001/0040983 A1 * 11/2001 Nishikawa .................. 382/109

* cited by examiner

Primary Examiner—D Rutledge
(74) Attorney, Agent, or Firm—Fulbright & Jaworski L.L.P.

(57) ABSTRACT

A photo printing apparatus (100) with a data converter (22) for converting inputted image data of a photo film (1) into print data with a print density set for each pixel in images, and a print head (4) for forming images on print sheets based on the print data. The data converter (22) includes a basic conversion processor (40) for converting the image data to exclude color information intrinsic to the photo film from the inputted image data, and an image quality corrector (50) for performing an image quality correction process for the image data based on attribute information on the photo film and with conditions corresponding to the photo film.

5 Claims, 3 Drawing Sheets

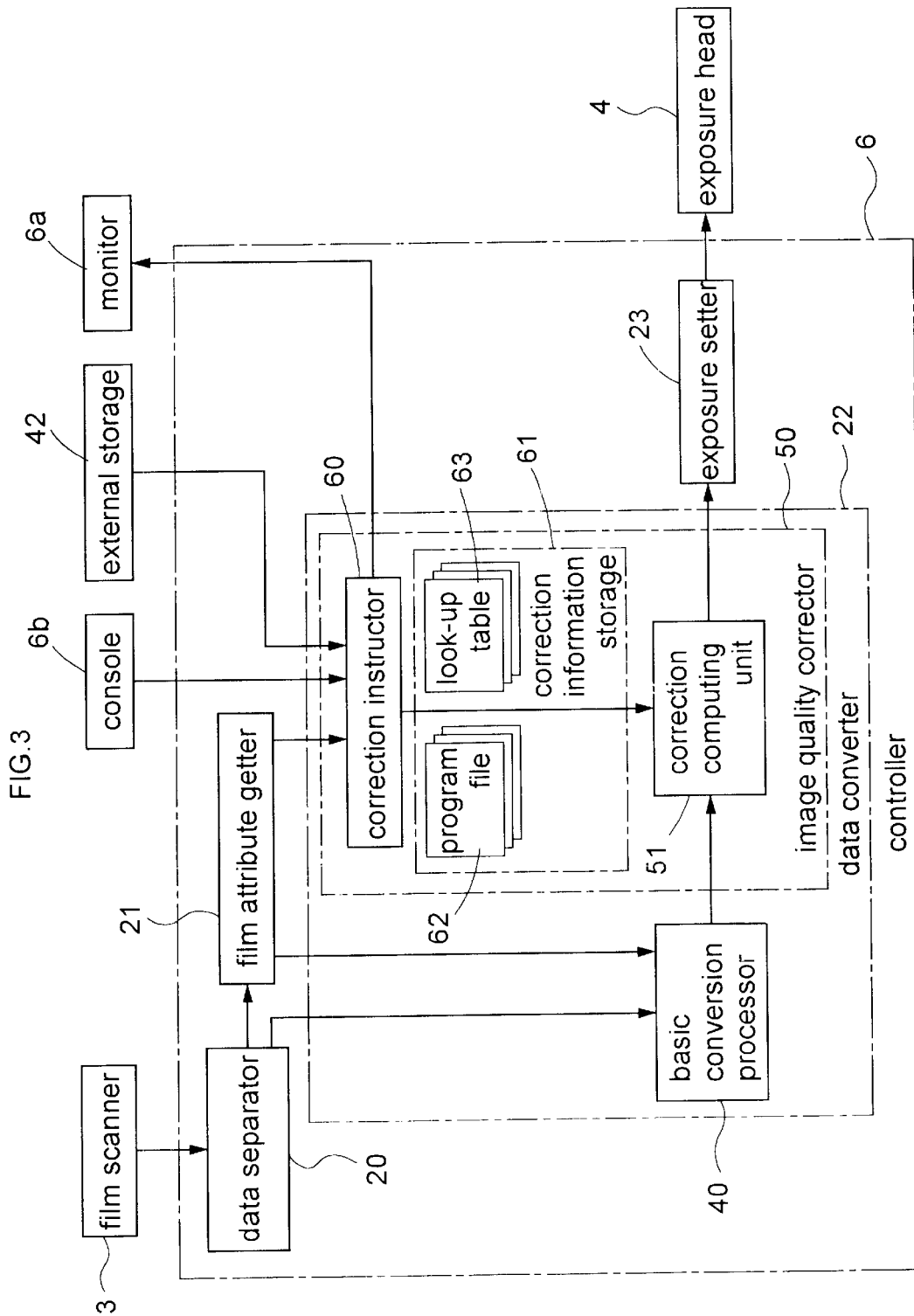

PHOTO PRINTING APPARATUS

BACKGROUND OF THE INVENTION

1. Field of the Invention

This invention relates to a photo printing apparatus having a data converter for converting inputted image data of photo film into print data with a print density level set for each pixel of images, and a print head for forming images on print sheets based on the print data.

2. Description of the Related Art

Such an image printing apparatus creates, from inputted image data of photo film, print data with a print density level set for each pixel of images, and forms images on print sheets based on the print data.

In setting the print data as above, the data converter performs a conversion process to convert the image data in a way to exclude color information intrinsic to the photo film which is included in the inputted image data. The data converter performs also an image quality correction process to correct the quality of the image data.

As is particularly conspicuous with negative film, photo film has color information (such as the base color of the photo film) corresponding to the type of photo film. This color information is included in the inputted image data of the photo film. To expose images photographed on the photo film properly, the color information intrinsic to the photo film must be excluded from the image data. The data converter carries out this process.

This basic conversion process is performed under different processing conditions to cope with different types of photo film. In principle, photo films are grouped according to type, or photo films having similar characteristics are grouped together, and processing conditions are set for each individual group. As distinct from this basic conversion process, the image quality correction process is, in a sense, a correction for the print head, and in conventional practice fixed processing conditions are set thereto.

With conventional photo printing apparatus, however, even where processing conditions are set for the basic conversion process by taking the type of film into account, the print image quality obtained is not always satisfactory. Thus, there is room for improvement.

SUMMARY OF THE INVENTION

The object of this invention is to eliminate the drawback of the prior art noted above and to achieve an improvement in the image quality of photo prints made from photo film.

In order to fulfill the above object, a photo printing apparatus according to this invention comprises a data converter for converting inputted image data of a photo film into print data with a print density set for each pixel in images, the data converter including a basic conversion processor for converting the image data to exclude color information intrinsic to the photo film from the inputted image data, and an image quality corrector for performing an image quality correction process for the image data based on attribute information on the photo film and with conditions corresponding to the photo film.

With this construction, the data converter converts inputted image data into print data for use in image formation by the print head, through a basic conversion process to convert the inputted image data to exclude color information intrinsic to the photo film from the inputted image data, and an image quality correction process for the image data based on attribute information on the photo film and with conditions corresponding to the photo film.

What is known as a digital photo printer that prints images based on print data with a print density set for each pixel in the images has, in recent years, been improved remarkably in print image quality also in a printing mode for exposing and forming images on printing paper, for example. However, although the data converter performs the basic conversion process to exclude color information intrinsic to photo film from inputted image data, variations do occur in print image quality with different types of photo film. The inventor herein has found that such variations are due to image quality correction processes carried out with uniform processing conditions.

As a specific example easy to understand, although images of a high sensitivity film with a coarse particle photosensitive material are to be printed, the data converter may carry out a sharpness correction by way of image quality correction process, with settings based on a low sensitivity film with a fine particle photosensitive material. In such a case, the resulting print quality could present a somewhat rough impression.

To avoid such an inconvenience, the data converter according to this invention performs an image quality correction process based on attribute information on a photo film and with processing conditions corresponding to the photo film. Such an elaborate image quality correction process enables a further improvement in print image quality.

The above attribute information on photo film may consist, for example, only of information on the sensitivity of the photo film, depending on the image quality correction process to be performed. In that case, only the sensitivity information may be inputted as attribute information. Conversely, where inputting of a particular characteristic of photo film is inadequate, the brand of photo film, for example, may be inputted as attribute information. Generally, such attribute information is recorded on the photo film itself or on a package or the like of the photo film. This recorded information may be read and inputted.

In a preferred embodiment of this invention, the photo printing apparatus further comprises an attribute information getter for acquiring the attribute information on the photo film. The attribute information on the photo film acquired by this attribute information getter is used in the image quality correction process performed by the image quality corrector.

Attribute information on photo film may be inputted by the operator. However, the operator's workload may be lightened, for example, by automatically detecting attribute information on photo film recorded on the photo film itself or on a package or the like of the photo film.

In another preferred embodiment of this invention, the data converter includes a correction information storage storing processing information for execute the image quality correction process. This construction can promptly change the processing conditions in response to a change in the type of photo film handled. Further, the processing information stored in the correction information storage may be revisable in response to an image quality correction data change instruction inputted from a manually operable input device. Then, by rewriting the data in a look-up table by an input operation made by the operator, for example, a fine adjustment may be made to the processing conditions already set for the image quality correction process. This feature provides a flexibility for coping with a necessity for changing the processing conditions caused by various factors.

In a preferred embodiment, new processing information for the image quality correction process is storable in the correction information storage in response to an image quality correction data register instruction inputted from a manually operable input device. In this case, when starting to use a new type of photo film not having been used at all, processing conditions for this type of photo film may be registered in the look-up table, thereby to realize prints of excellent image quality.

In a preferred embodiment, the correction information storage includes a program file for storing various correction programs corresponding to the photo film attribute information, and a look-up table for storing various correction factor data corresponding to the photo film attribute information.

Other features and advantages of this invention will be apparent from the following description of the embodiment to be taken with reference to the drawings.

BRIEF DESCRIPTION OF THE DRAWINGS

FIG. 3 is a block diagram illustrating functions of the photo printing apparatus shown in FIG. 1.

DESCRIPTION OF THE PREFERRED EMBODIMENT

A photo printing apparatus to which this invention is applied will be described hereinafter with reference to the drawings.

Figure 1:
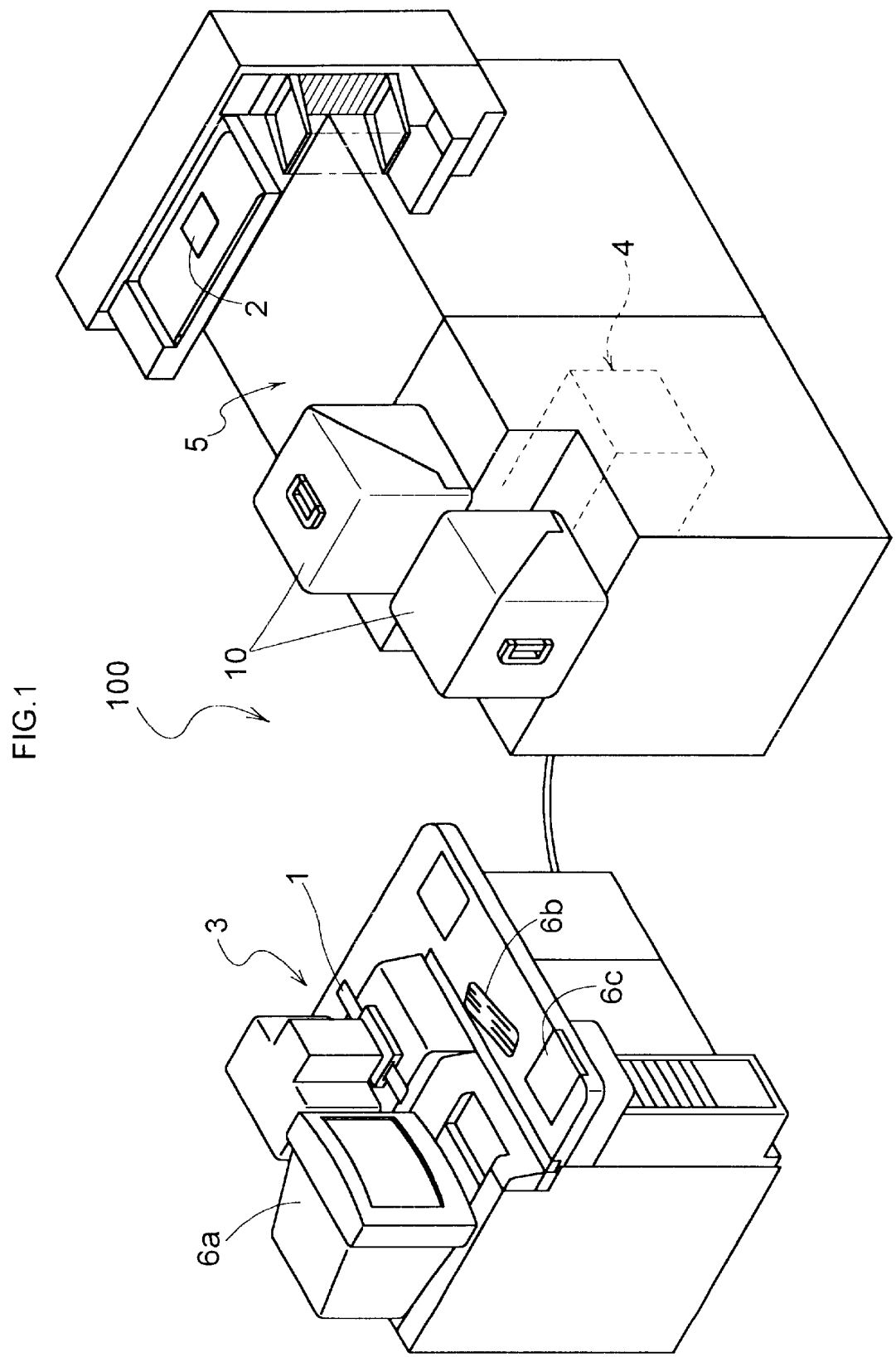
FIG. 1 is a perspective view of a photo printing apparatus according to this invention.
Figure 2:
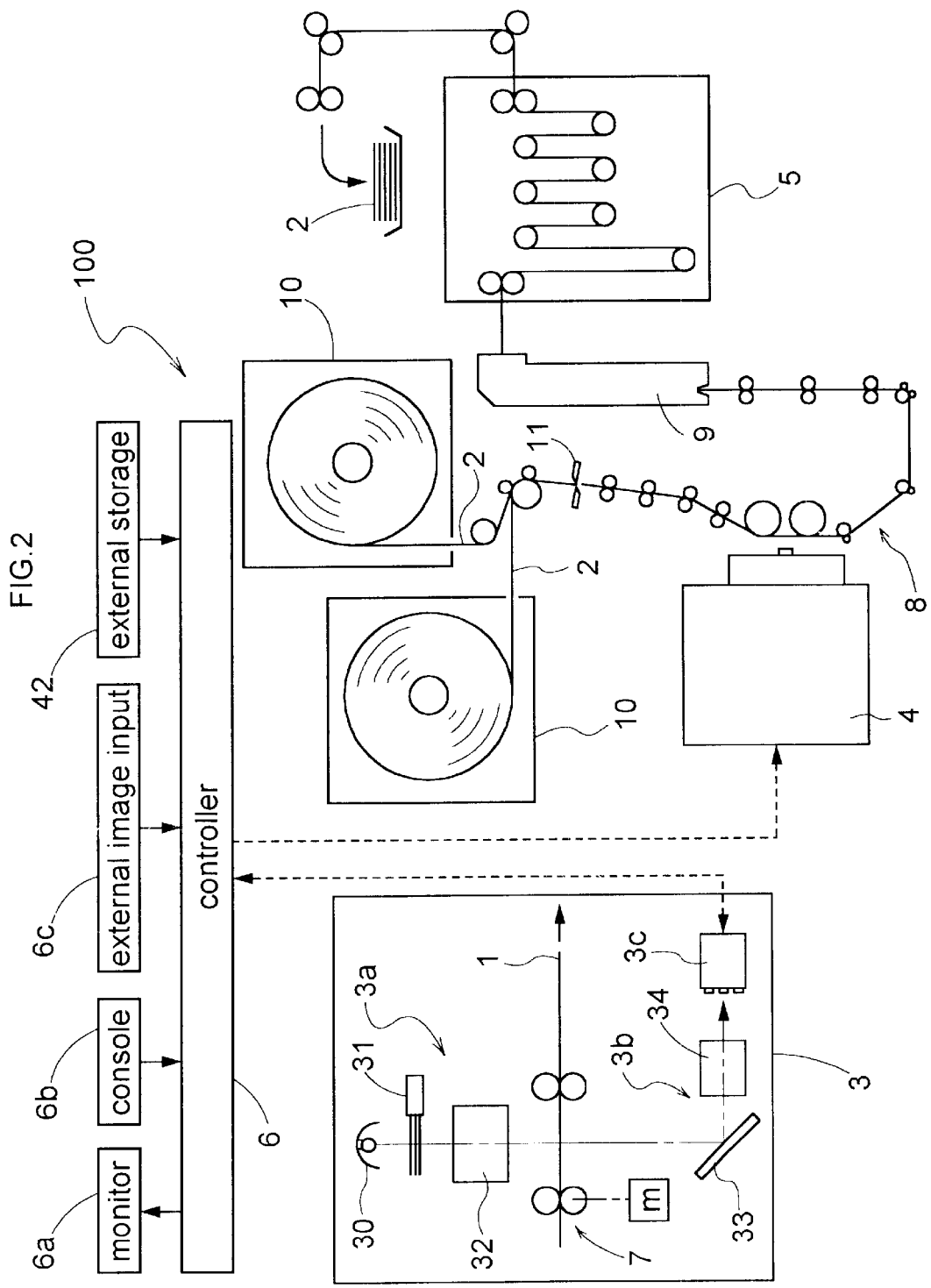
FIG. 2 is a block diagram of the photo printing apparatus shown in FIG. 1.

A photo printing apparatus 100, as shown in a perspective view of FIG. 1 and a block diagram of FIG. 2, includes a film scanner 3 for acquiring frame images of photo film 1 as digital image data, a controller 6 for processing the digital image data acquired and creating print data, an exposure head 4 acting as print head for exposing, based on the print data, images corresponding to the frame images on printing paper 2 acting as print sheets, and a developing station 5 for developing the exposed printing paper 2. The printing paper 2 developed in the developing station 5 is discharged through a drying stage, as finished prints having copy images.

The controller 6 has, connected thereto, a monitor 6a for displaying various processing information, a console 6b for inputting various control instructions, and an external image input 6c for receiving image data from image data recording media such as memory cards, MOs and FDs, and digital image data transmitted through a communication line. With the external image input 6c, the photo printing apparatus 100 can handle not only the film 1 for inputting original images, but also photo images taken with digital cameras and CG images made with computer graphics software and the like.

As shown in FIG. 2, the film scanner 3 includes illuminating optics 3a, image pickup optics 3b, a photoelectric converter 3c, and a film transport mechanism 7 for transporting the film 1. The illuminating optics 3a illuminate the film 1 with light beams emitted from a halogen lamp 30 and having a color distribution and intensity distribution adjusted through a light adjustment filter 31 and a mirror tunnel 32. The image pickup optics 3b have a reflecting mirror 33 for deflecting by 90 degrees a path of light transmitted through the film 1, and a zoom lens 34 for forming images of light transmitted through the film 1 on a light receiving plane of the photoelectric converter 3c. The photoelectric converter 3c performs a photoelectric conversion of the images of light transmitted through the film 1.

The photoelectric converter 3c includes a CCD sensor unit, a sample hold (S/H) circuit, an analog-to-digital converter and a sensor drive circuit which are known per se. The CCD sensor unit has three CCD sensors. Each CCD sensor is a line sensor with numerous (e.g. 5,000) CCD elements arranged in a main scanning direction, i.e. transversely of the film 1. In time of main scanning, the sensor drive circuit controls a charge accumulating operation and charge accumulating time of the CCD sensors. Each CCD sensor has a color filter disposed on an image pickup plane thereof for passing only the blue component, red component or green component of light beams. Thus, each CCD sensor carries out a photoelectric conversion of only the blue component, red component or green component. Digital image data acquired as RGB signals in the photoelectric converter 3c are transmitted to the controller 6.

The CCD sensor unit of photoelectric converter 3c has a reading width in the main scanning direction set larger than the width of film 1. Thus, the film scanner 3 can read not only the frame images of film 1, but also image portions including attribute information such as DX code and frame numbers recorded on a margin extending longitudinally of film 1. These data read are inputted along with the frame image data to the controller 6.

Though not shown in the drawings, the exposure head 4 has a halogen lamp for emitting light to a rotating filter having RGB color filters arranged circumferential thereof. Light beams emerging from the rotating filter irradiate a micromirror device having numerous micromirrors. The micromirror device, with the micromirrors driven according to an image to be printed, outputs the image through an imaging lens unit onto the printing paper 2.

The above micromirrors correspond to the pixels in the image to be printed, respectively. Each micromirror is swung, and an exposure of each micromirror or each pixel is set by an integrated time of light reflected by the micromirror and incident on the printing paper 2. This exposure is determined based on print data with a print density set for each pixel.

Specific examples of the exposure head 4 include, besides the above micromirror device used, a PLZT type head with PLZT light shutters arranged linearly, a fluorescent printing type head with fluorescent elements arranged linearly, an FO-CRT type head and so on.

The printing paper 2 is stored in the form of rolls in printing paper magazines 10. A paper transport mechanism 8 draws the printing paper 2 from the paper magazines 10 into a case of photo printing apparatus 100, and transports the paper 2 via a position of exposure by the exposure head 4 to a distributing device 9. The printing paper 2 drawn from the paper magazines 10, before reaching the position of exposure by the exposure head 4, is cut by a cutter 11 to an appropriate length according to print size.

The distributing device 9 receives the printing paper 2 transported in a row by the paper transport mechanism 8, and distributes the printing paper 1 to three rows to be transported downstream to the developing station 5. This distributing process is carried out to achieve an agreement between a short time taken by the exposure head 4 in exposing the printing paper 2 and a long developing time at the developing station 5 due to necessary chemical treatment given therein.

Next, a processing of digital image data read by the film scanner 3 and transmitted to the controller 6 will be described in outline.

The controller 6 has a print data creating function among various functions thereof produced by hardware and software. FIG. 3 illustrates the print data creating function, that is a function relating to setting of an exposure level for each pixel. As shown, the controller 6 includes a data separator 20 for receiving digital image data from the film scanner 3 and separating frame image data from image data having attribute information recorded on a marginal portion of film 1, a film attribute getter 21 for reading DX code from the image data of the film margin inputted from the data separator 20 and identifying the brand of film 1 as attribute information on the film 1, a data converter 22 for converting the image data of film 1 into print data for driving the exposure head 4, and an exposure setter 23 for converting the print data provided by the data converter 22 into exposure levels that determine times for operating the respective micromirrors of exposure head 4.

The above data converter 22 includes a basic conversion processor 40 for performing a basic conversion process to exclude color information intrinsic to the film 1 from the digital image data of frame images inputted from the data separator 20, and an image quality corrector 50 for performing an image quality correction process to correct the image quality of the digital image data of the frame images.

To execute the above process, the basic conversion processor 40 is constructed as a conversion table storing conversion data for each brand of film 1. Based on information inputted from the film attribute getter 21 and showing the brand of film 1, the basic conversion processor 40 determines conversion data for use in the conversion process, and, by using this conversion data, excludes color information intrinsic to the film 1 from the image data inputted. The same processing data is used where the film 1 is of a different brand but has a similar property.

The image quality corrector 50 includes a correction computing unit 51 for performing actual image quality correcting computations, and a correction instructor 60 for instructing the correction computing unit 51 to carry out a correction process.

The correction instructor 60 has a correction information storage 61 storing various correction programs for execute a series of image quality corrections such as contrast correction, sharpness correction and saturation correction, and correction factor data for each brand of film 1 to be used in the correction programs, and a control circuit for controlling rewriting of the programs and correction factor data in the correction information storage 61. The correction information storage 61 includes a program file 62 for storing the correction programs, and a look-up table 63 for storing the correction factor data.

The correction computing unit 51 is formed of a programmable DSP, for example. Each time the brand of film 1 to be printed is changed and I its information is inputted from the film attribute getter 21 to the correction instructor 60, the correction instructor 60 loads a correction program and correction factor data corresponding to that brand into the correction computing unit 51 from the program file 62 and the look-up table 63 storing the correction factor data. The correction computing unit 51 performs an image quality correcting process based on these correction program and correction factor data. As in the case of the basic conversion processor 40 described hereinbefore, the correction computing unit 51 uses the same correction program and correction factor data where the film 1 is of a different brand but has a similar property.

The correction information data stored in the correction information storage 61 of correction instructor 60 is rewritable. When an image quality correction data changing instruction is inputted from the console 6b acting as a manually operable input device, the brands of film 1 registered in the correction information storage 61 are first displayed on the monitor 6a. When one of the brands is designated from the console 6b, data for rewriting the correction program or correction factor data for the designated brand of film 1 is read from an external storage 42 such as a floppy disk drive, and the data in the correction information storage 61 is rewritten.

Further, correction programs and correction factor data for brands of film 1 whose correction information is not registered in advance may be added to the program file 62 and look-up table 63. Storage areas are secured for such new additions.

When an image quality correction data registering instruction is inputted from the console 6b acting as a manually operable input device, data for writing a correction program and correction factor data for that brand of film 1 is read, along with information identifying the brand, from the external storage 42. The correction program and correction factor data are written to the program file 62 and look-up table 63 of correction information storage 61.

When, in the above construction, a film 1 to be printed is loaded in the film scanner 3, the film transport mechanism 7 starts transporting the film 1. The film scanner 3 reads image information from frame images of film 1 and attribute information from the marginal portion of film 1, and transmits the information as image data to the controller 6.

The image data inputted to the controller 6 is separated into image data of the frame images and image data of the marginal portion of film 1 by the data separator 20. As the image data of the marginal portion is inputted to the film attribute getter 21, the brand of film 1 is identified from DX code included in the image data.

Information on the brand of this film 1 is inputted to the basic conversion processor 40 and image quality corrector 50 where processing conditions are selected according to the film 1.

A basic conversion process and an image quality correction process selected as above are carried out for the image data of the frame images inputted from the data separator 20, to create print data specifying a print density for each pixel. Based on this print data, the exposure setter 23 sets an exposure level for each pixel (i.e. an operating time of each micromirror). The exposure head 4 is operated to form latent images of the frame images on the printing paper 2 transported by the paper transport mechanism 8.

The exposed printing paper 2 is developed in the developing station 5, and thereafter discharged as finished prints.

OTHER EMBODIMENTS

Other embodiments of this invention are listed below.
(1) In the foregoing embodiment, the film scanner 3 reads a DX code of film 1 along with frame images. Instead, a sensor may be provided separately for reading DX codes.
(2) In the foregoing embodiment, the brand of film 1 is detected as attribute information on the film 1. Instead, information on the sensitivity included in the DX code may be used as attribute information.
(3) In the foregoing embodiment, attribute information on the film 1 is obtained by reading the DX code recorded on the film 1. Alternatively, attribute information may be obtained by reading information recorded on a package such as a cartridge of film 1. Where, as in the case of what is known as an APS film, attribute information is magnetically recorded on the film 1, a magnetic reader may be used to read the attribute information.

(4) In the foregoing embodiment, the data converter 22 that converts image data of a photo film into print data includes the basic conversion processor 40 and image quality corrector 50 for separately performing a basic conversion process and an image quality correction process. The correction program executed by the correction computing unit 51 and the correction factor may be modified to perform the process of the basic conversion processor 40, thereby to perform the basic conversion process and image quality correction process in an integrated way.

What is claimed is:

1. A photo printing apparatus comprising:

a film scanner for acquiring, as digital image data, frame images on a photo film;

a base conversion processor for processing said image data using a conversion table to exclude a color component intrinsic to said photo film and included in said image data acquired by said film scanner, said conversion table being prepared for each type of said photo film;

a correction information storage for storing correction factor data for image quality correction programs, said correction factor data being prepared for each photo film attribute information corresponding to said photo film;

an image quality corrector for performing an image quality correction process for said image data processed by said basic conversion processor, using said correction factor appropriate to said photo film attribute information corresponding to said photo film; and a print head for forming images on a print sheet based on print data converted from said image data processed by said image quality corrector.

2. A photo printing apparatus as defined in claim 1, further comprising an attribute information getter for acquiring said photo film attribute information on said photo film to be processed.

3. A photo printing apparatus as defined in claim 1, wherein said photo film attribute information is the sensitivity of said photo film.

4. A photo printing apparatus as defined in claim 1, wherein said correction factor data stored in said correction information storage is revisable in response to an image quality correction data change instruction inputted from a manually operable input device.

5. A photo printing apparatus as defined in claim 1, wherein new precessing information for said image quality correction process is storable in said correction information storage in response to an image quality correction data register instruction inputted from a manually operable input device.

* * * * *